(12) United States Patent
Potnis et al.

(10) Patent No.: US 11,630,318 B2
(45) Date of Patent: Apr. 18, 2023

(54) OPTICAL ELEMENTS FOR DISPLAYS

(71) Applicant: GOOGLE LLC, Mountain View, CA (US)

(72) Inventors: Shreyas Potnis, Kitchener (CA); Timothy Paul Bodiya, Toronto (CA)

(73) Assignee: GOOGLE LLC, Mountain View, CA (US)

( * ) Notice: Subject to any disclaimer, the term of this patent is extended or adjusted under 35 U.S.C. 154(b) by 460 days.

(21) Appl. No.: 16/737,322

(22) Filed: Jan. 8, 2020

(65) Prior Publication Data

US 2020/0225502 A1 Jul. 16, 2020

Related U.S. Application Data

(60) Provisional application No. 62/946,705, filed on Dec. 11, 2019, provisional application No. 62/791,514, filed on Jan. 11, 2019.

(51) Int. Cl.
| | | |
|---|---|---|
| *G02B 27/01* | (2006.01) | |
| *G02B 27/42* | (2006.01) | |
| *G06F 1/16* | (2006.01) | |
| *F21V 8/00* | (2006.01) | |
| *G02B 5/32* | (2006.01) | |

(52) U.S. Cl.
CPC ............. *G02B 27/425* (2013.01); *G02B 5/32* (2013.01); *G02B 6/0026* (2013.01); *G06F 1/163* (2013.01)

(58) Field of Classification Search
CPC ...... G06T 19/006; G02B 27/425; G02B 5/32; G02B 6/0026; G02B 27/0081; G02B 2027/0174

USPC ..................... 359/15, 34, 630, 569
See application file for complete search history.

(56) References Cited

U.S. PATENT DOCUMENTS

| | | | |
|---|---|---|---|
| 2010/0321781 A1 | 12/2010 | Levola et al. | |
| 2016/0231570 A1 | 8/2016 | Levola et al. | |
| 2016/0234485 A1* | 8/2016 | Robbins | G06T 19/006 |
| 2017/0102543 A1* | 4/2017 | Vallius | G06T 19/006 |

(Continued)

FOREIGN PATENT DOCUMENTS

| | | |
|---|---|---|
| GB | 2529003 A | 2/2016 |
| WO | 2017062139 A1 | 4/2017 |
| WO | 2018094093 A1 | 5/2018 |

OTHER PUBLICATIONS

International Search Report and Written Opinion dated Apr. 1, 2021 for International Application No. PCT/US2020/064422, 19 pages.

*Primary Examiner* — Audrey Y Chang

(57) ABSTRACT

There is provided an optical element which includes a medium including a diffractive optical element (DOE). The medium is to receive a beam of light via a light guide. If the beam is incident upon the medium at an incidence angle within a first range of angles, the DOE is to direct a first portion of the beam out of the light guide along a second direction to form an outcoupled beam, and cause a second portion of the beam to propagate towards a surface of the light guide. Furthermore, if the incidence angle is within a second range of angles, the DOE is to split from the beam a third portion and a fourth portion each propagating towards the surface of the light guide. The third and fourth portions are to propagate along a third and a fourth direction respectively, which third direction is different than the fourth direction.

20 Claims, 9 Drawing Sheets

(56) References Cited

U.S. PATENT DOCUMENTS

| | | |
|---|---|---|
| 2017/0139210 A1 | 5/2017 | Vallius |
| 2018/0074340 A1 | 3/2018 | Robbins et al. |
| 2018/0210146 A1 | 7/2018 | Klug et al. |

* cited by examiner

OPTICAL ELEMENTS FOR DISPLAYS

CROSS REFERENCE TO RELATED APPLICATIONS

This application claims the benefit of the following applications, each of which is incorporated by reference herein in their entirety:
U.S. Provisional Patent Application No. 62/791,514, filed Jan. 11, 2019, titled "Systems, Devices, and Methods for Light Guide Based Wearable Heads-Up Displays".
U.S. Provisional Patent Application No. 62/943,381, filed Dec. 4, 2019, titled "Optical Elements and Methods of Making the Same".
U.S. Provisional Patent Application No. 62/946,705, filed Dec. 11, 2019, titled "Optical Elements for Displays".

FIELD

The present specification relates to optical elements, and in particular to optical elements for use in displays.

BACKGROUND

Optical systems may use optical elements to manipulate light. Such optical elements may use diffractive optical elements (DOEs) to reflect, refract, or otherwise change the light. Surface relief gratings (SRGs) and holograms are examples of such DOEs. SRGs may be made by creating a pattern of refractive index variations on or near the surface of an optical medium. In some examples, the pattern of refractive index variations may arise from a physical or structural pattern at or near the surface of the medium. Holograms may also be made by creating patterns of variations in the refractive index of an optical medium. Refractive index may also be referred to as "the index of refraction". Making SRGs or holograms by creating the variations in the refractive index may also be described as writing or recording the SRG or hologram in the medium.

SUMMARY

According to an implementation of the present specification there is provided an optical element comprising: a medium comprising a diffractive optical element (DOE), the medium to receive a beam of light propagating along a first direction via a light guide at a first incidence point on the medium, the beam incident upon the DOE at the first incidence point, the DOE to: if the beam is incident upon the medium at an incidence angle within a first range of angles relative to the medium: direct a first portion of the beam out of the light guide along a second direction to form an outcoupled beam; and cause a second portion of the beam to propagate towards a surface of the light guide; and if the incidence angle is within a second range of angles relative to the medium: split from the beam a third portion and a fourth portion each propagating towards the surface of the light guide, the third portion and the fourth portion propagating along a third direction and a fourth direction respectively, the third direction different than the fourth direction.

The third direction may be about orthogonal to the fourth direction.

The third direction may be opposite to the fourth direction.

The first range of angles may be outside the second range of angles.

The DOE may comprise a surface relief grating.

The DOE may comprise a hologram.

The hologram may comprise a two-dimensional hologram.

The medium may comprise a holographic recording medium.

The holographic recording medium may comprise a photopolymer.

The hologram may comprise: a first hologram to: if the incidence angle is within the first range of angles relative to the medium: direct the first portion of the beam out of the light guide to form the outcoupled beam; and cause the second portion of the beam to propagate towards the surface the light guide; and a second hologram to: if the incidence angle is within the second range of angles relative to the medium: split from the beam the third portion and the fourth portion each propagating towards the surface of the light guide, the third portion and the fourth portion propagating along the third direction and the fourth direction respectively, the third direction different than the fourth direction.

The first hologram may be recorded in a first volume within the holographic recording medium; and the second hologram may be recorded in a second volume within the holographic recording medium, the second volume overlapping the first volume.

At least one of the first hologram and the second hologram may comprise at least one of a corresponding wavelength-multiplexed hologram and a corresponding angle-multiplexed hologram.

At least one of the first hologram and the second hologram may comprise a plurality of holograms.

The optical element may further comprise the light guide.

The medium may be disposed on the light guide.

The medium may be disposed at least partially inside the light guide.

The DOE may be to: if the incidence angle is within the first range of angles: cause the second portion of the beam to propagate towards the surface of the light guide along a fifth direction; and the surface of the light guide is to reflect the second portion towards the medium along a sixth direction, the sixth direction being within the first range of angles relative to the medium.

The surface of the light guide may be to reflect the third portion towards the medium along a seventh direction, the seventh direction being within the first range of angles relative to the medium.

The surface of the light guide may be to reflect the fourth portion towards the medium along an eighth direction, the eighth direction being within the second range of angles relative to the medium.

The optical element may further comprise: an incoupler optically coupled to the light guide, the incoupler to receive the beam from a source external to the optical element and direct at least a portion of the beam into the light guide.

The incoupler may comprise a hologram.

The DOE may be further to: if the incidence angle is within the second range of angles: split from the beam a fifth portion propagating towards the surface of the light guide along a ninth direction.

The surface of the light guide may be to reflect the fifth portion towards the medium along a tenth direction being about parallel to the first direction.

According to another implementation of the present specification there is provided a wearable heads-up display (WHUD) comprising: a light engine to generate a beam of light; and a display optic to receive the beam from the light engine and direct the beam towards an eye of a user of the WHUD to form an image viewable by the user. The display optic comprises: a light guide; an incoupler optically coupled to the light guide, the incoupler to receive the beam from the light engine and direct at least a portion of the beam to propagate along a first direction into the light guide; and an optical element. The optical element comprises: a medium comprising a diffractive optical element (DOE), the medium to receive the beam propagating along the first direction via the light guide at a first incidence point on the medium, the beam incident upon the DOE at the first incidence point: if the beam is incident upon the medium at an incidence angle within a first range of angles relative to the medium: direct a first portion of the beam out of the light guide along a second direction to form an outcoupled beam; and cause a second portion of the beam to propagate towards a surface of the light guide; and if the incidence angle is within a second range of angles relative to the medium: split from the beam a third portion and a fourth portion each propagating towards the surface of the light guide, the third portion and the fourth portion propagating along a third direction and a fourth direction respectively, the third direction different than the fourth direction.

The third direction may be about orthogonal to the fourth direction.

The third direction may be opposite to the fourth direction.

The first range of angles may be outside the second range of angles.

The DOE may comprise a surface relief grating.

The DOE may comprise a hologram.

The hologram may comprise a two-dimensional hologram.

The medium may comprise a holographic recording medium.

The holographic recording medium may comprise a photopolymer.

The hologram may comprise: a first hologram to: if the incidence angle is within the first range of angles relative to the medium: direct the first portion of the beam out of the light guide to form the outcoupled beam; and cause the second portion of the beam to propagate towards the surface the light guide; and a second hologram to: if the incidence angle is within the second range of angles relative to the medium: split from the beam the third portion and the fourth portion each propagating towards the surface of the light guide, the third portion and the fourth portion propagating along the third direction and the fourth direction respectively, the third direction different than the fourth direction.

The first hologram may be recorded in a first volume within the holographic recording medium; and the second hologram may be recorded in a second volume within the holographic recording medium, the second volume overlapping the first volume.

At least one of the first hologram and the second hologram may comprise at least one of a corresponding wavelength-multiplexed hologram and a corresponding angle-multiplexed hologram.

At least one of the first hologram and the second hologram may comprise a plurality of holograms.

The medium may be disposed on the light guide.

The medium may be disposed at least partially inside the light guide.

The DOE may be to: if the incidence angle is within the first range of angles: cause the second portion of the beam to propagate towards the surface of the light guide along a fifth direction; and the surface of the light guide is to reflect the second portion towards the medium along a sixth direction, the sixth direction being within the first range of angles relative to the medium.

The surface of the light guide may be to reflect the third portion towards the medium along a seventh direction, the seventh direction being within the first range of angles relative to the medium.

The surface of the light guide may be to reflect the fourth portion towards the medium along an eighth direction, the eighth direction being within the second range of angles relative to the medium.

The incoupler may comprise a hologram.

The DOE may be further to: if the incidence angle is within the second range of angles: split from the beam a fifth portion propagating towards the surface of the light guide along a ninth direction.

The surface of the light guide may be to reflect the fifth portion towards the medium along a tenth direction being about parallel to the first direction.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1:
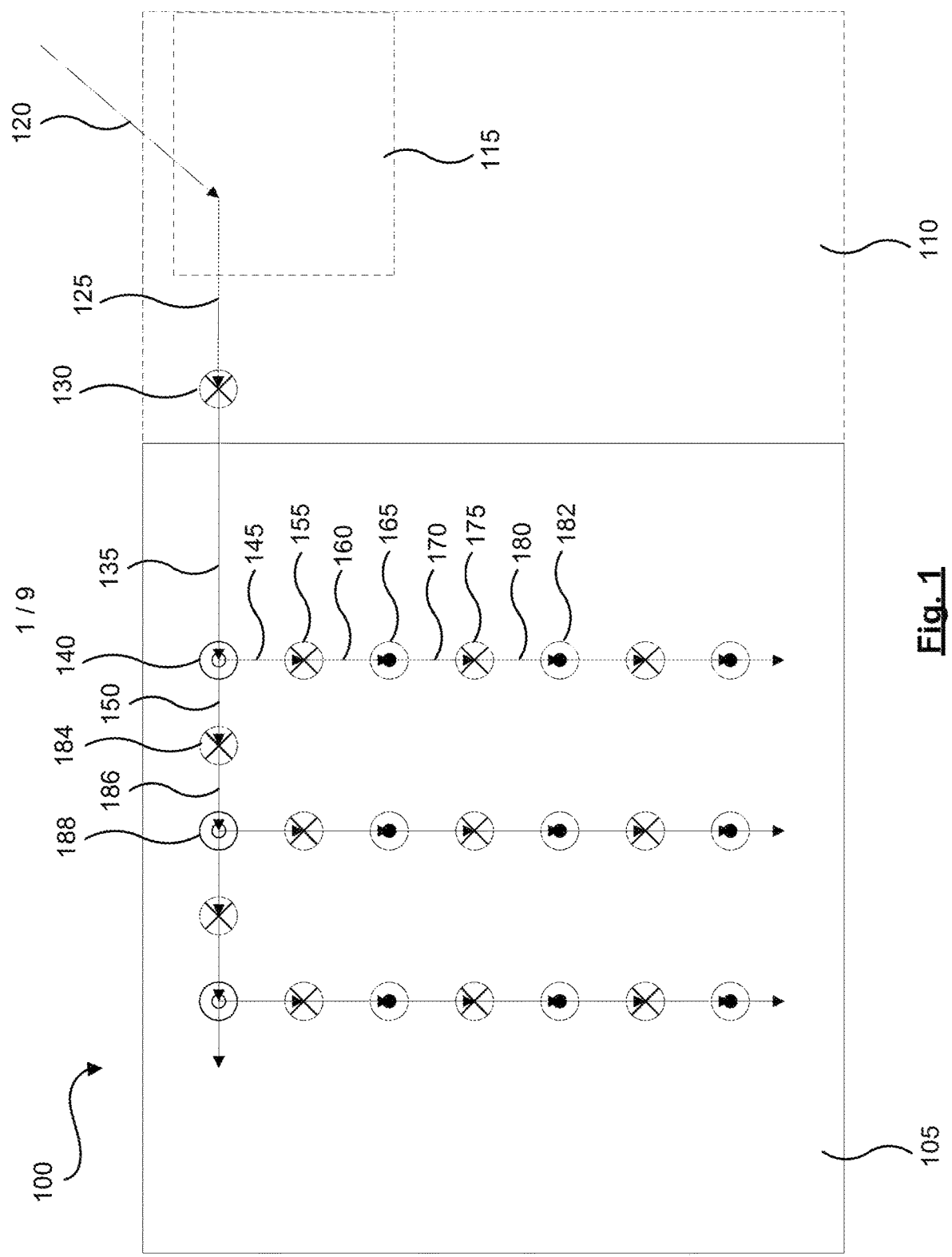
FIG. 1 shows a schematic top plan view of an example optical element, in accordance with a non-limiting implementation of the present specification.

In the following description, certain specific details are set forth in order to provide a thorough understanding of various disclosed implementations. However, one skilled in the relevant art will recognize that implementations may be practiced without one or more of these specific details, or with other methods, components, materials, and the like. In other instances, well-known structures associated with light sources have not been shown or described in detail to avoid unnecessarily obscuring descriptions of the implementations.

Unless the context requires otherwise, throughout the specification and claims which follow, the word "comprise" and variations thereof, such as, "comprises" and "comprising" are to be construed in an open, inclusive sense, that is as "including, but not limited to."

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations.

Throughout this specification and the appended claims, the term "carries" and variants such as "carried by" are generally used to refer to a physical coupling between two objects. The physical coupling may be direct physical coupling (i.e. with direct physical contact between the two objects) or indirect physical coupling that may be mediated by one or more additional objects. Thus, the term carries and variants such as "carried by" are meant to generally encompass all manner of direct and indirect physical coupling, including without limitation: carried on, carried within, physically coupled to, secured to, or supported by, with or without any number of intermediary physical objects therebetween.

Displays may use optical elements to guide and manipulate light to form images. In order for a viewer to be able to view the image, the pupil of the eye of the viewer should be in the field of view of the display. The viewer of the display may also be described as the user of the display. In the case of displays that are positioned or worn relatively near the eye of the viewer, the field of view may be described as or indicated by an eyebox of the display. Examples of such displays worn near the eye of the viewer may include wearable heads-up displays (WHUDs), and the like.

The eyebox may describe an area of possible positions of the pupil of the eye of the viewer relative to the display. When the pupil is positioned within the eyebox, light from at least one exit pupil generated by the display enters the pupil, thereby allowing the viewer to see the image formed by the display. In this manner, the eyebox may describe or provide a measure of the field of view of the display.

As a user directs his gaze in different directions, the position of the pupil may change relative to the eye of the user. In addition, the position of the eye may also change relative to the display. For example, in the case of WHUDs, the display may shift relative to the eye or face of the user during vigorous physical movement, and the like. In order to allow the display to remain viewable by the user despite these changes in the position of the pupil or the eye relative to the display, the number of exit pupils generated by the display may be increased to enlarge the eyebox of the display.

FIG. 1 shows a schematic top plan view of an example optical element 100, which may be used to increase or expand the number of exit pupils generated by a display. As such, optical element 100 may also be described as an exit pupil expander (EPE). In addition to increasing the number of exit pupils, optical element 100 may also outcouple a portion of the display beam of light out of the optical components of the display and direct the beam towards the eye of the viewer to form images viewable by the viewer. As such, optical element 100 may also act as an optical outcoupler (OC). In view of its dual functions as an EPE and OC, optical component 100 may also be described as a combined exit pupil expander and outcoupler, or EPE/OC in short.

Figure 3:
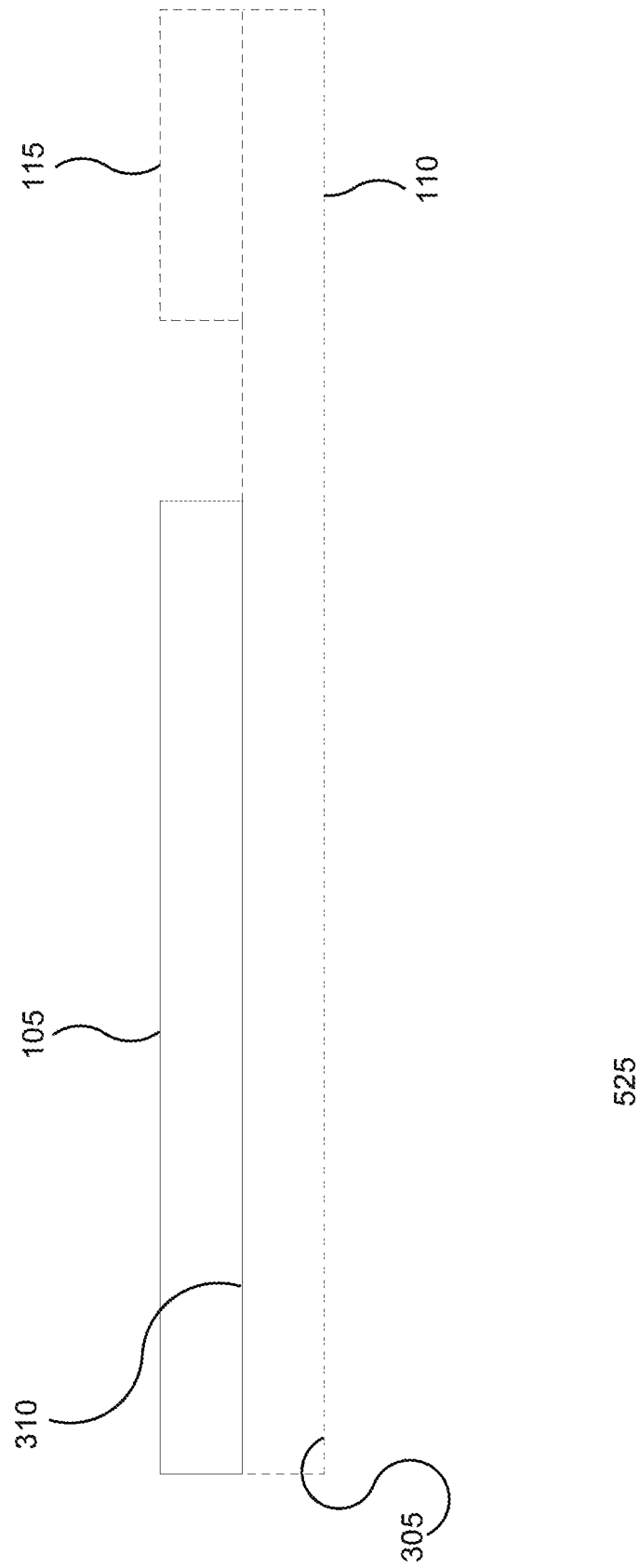
FIG. 3 shows a schematic side elevation view of the optical element of FIG. 1.

Optical element 100 comprises a medium 105, which in turn comprises a diffractive optical element (DOE). A DOE may comprise an optical element that interacts with light on the basis of optical diffraction. Examples of DOEs include holograms, SRGs, and the like. In some examples, medium 105 may be optically coupled with a light guide 110. Furthermore, in some examples, light guide 110 may comprise glass, or other materials or structures suitable for conducting light. In addition, in some examples medium 105 may be disposed or carried on, or at least partially inside, light guide 110. FIG. 3 shows a schematic side elevation view of optical element 100. FIG. 3 shows that in some examples medium 105 may be disposed or carried on light guide 110.

Referring back to FIG. 1, in some examples an incoupler (IC) 115 may be optically coupled with light guide 110. In some examples, IC 115 may comprise a hologram, a SRG, or the like. A display beam 120 of light may be used for forming an image viewable by a user of a display, such as a WHUD and the like. Beam 120 may be incident upon IC 115 which directs at least a portion of beam 120 into light guide 110 to form an incoupled beam 125. In some examples, incoupler 115 may receive the beam from a source external to optical element 100, which external source may include a light engine, a light spatial modulator, and the like. Such external sources are described in greater detail in relation to FIGS. 7 and 8.

Beam 125 becomes incident upon a surface of light guide 110 at an incidence position 130. Incidence positions may also be referred to as incidence points. Incidence position 130 is denoted by a cross within a circle in FIG. 1. This symbol is used to indicate incidence positions on the surface of the light guide, at which positions the incoming beam is reflected by light guide 110. These reflected beams may be reflected back towards medium 105.

At incidence position 130, incoupled beam 125 is reflected by the surface of light guide 110 to form beam 135 propagating towards medium 105. Referring to FIG. 3, in some examples a surface 305 of light guide 110 may reflect incoupled beam 125. It is also contemplated that in some examples, a surface 310 of light guide 110 may reflect incoupled beam 125. In general, one or more of surface 305, surface 310, and other surfaces of the light guides described herein may reflect beams of light towards medium 105 and the other media described herein.

Referring back to FIG. 1, medium 105 may receive beam 135 via light guide 110 at an incidence position 140 on medium 105. Beam 135 is incident upon the DOE of medium 105 at incidence position 140. At incidence position 140, the DOE splits from beam 135 beams 145 and 150 each propagating towards the surface of light guide 110 along corresponding directions indicated by the arrows associated with beams 145 and 150 in FIG. 1. Incidence position 140 is denoted by two concentric unfilled circles in FIG. 1. This symbol is used to indicate incidence positions on the DOE of medium 105 at which positions a plurality of offspring beams propagating in different directions are split from the original beam.

As shown in FIG. 1, the direction of beam 145 is different than the direction of beam 150. Beam 145 may be about orthogonal to beam 150. In some examples, beam 145 being about orthogonal to beam 150 may comprise beam 145 forming an angle with beam 150, which angle is within 10%, 5%, 2%, or 1% of 90 degrees. It is also contemplated that in some examples, beams 145 and 150 may be oriented at an angle to one another other than a right angle. For example, the beams split from beam 135 may propagate in opposite directions relative to one another, and the like.

Beam 145, in turn, propagates towards and becomes incident upon the surface of light guide 110 at incidence position 155. The surface of light guide 110 reflects beam 145 back towards the DOE to form beam 160. Beam 160 then becomes incident upon the DOE at incidence position 165. Incidence position 165 is denoted by two concentric circles in FIG. 1, the inner circle being filled and the outer circle being unfilled. This symbol is used to indicate incidence positions on the DOE at which positions a first portion of the incoming beam is directed out of light guide 110 to form an outcoupled beam. This outcoupled beam then propagates along a corresponding direction away from light guide 110 and medium 105 towards an eye of a viewer to form an image viewable by the viewer.

Figure 2:
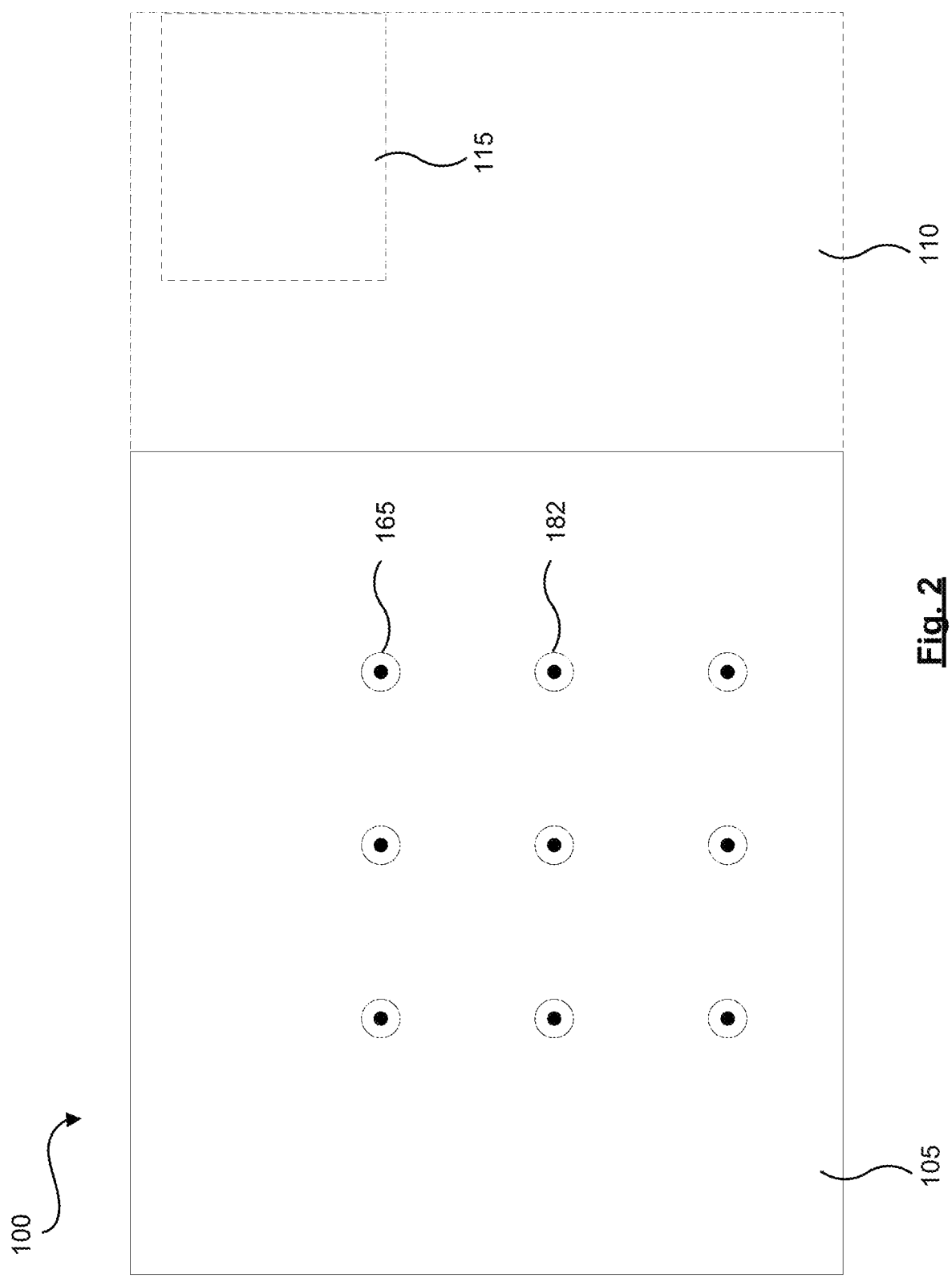
FIG. 2 shows another schematic top plan view of the optical element of FIG. 1.

Each incidence position on the DOE where light is outcoupled towards the eye of the user may form an exit pupil (EP). In other words, the incidence positions denoted by filled and unfilled concentric circles may represent EPs. FIG. 2 depicts a schematic top plan view of the optical element of FIG. 1, and illustrates the array of EPs generated by the DOE as shown in FIG. 1.

At incidence position 165, the DOE causes a second portion of beam 160 to propagate towards the surface of light guide 110. This second portion is shown as beam 170 in FIG. 1. In some examples, the DOE may cause the second portion of beam 160 to propagate towards the surface of light guide 110 by one or more of reflecting the second portion, deflecting or redirecting the second portion, transmitting the second portion, and the like.

The DOE may interact differently with beams of light based on the angle of incidence of those beams relative to the DOE. For example, beams whose angles of incidence are within a first range angles that encompasses the incidence angle of beam 160 may be partially outcoupled, and partially directed or caused to propagate towards light guide 110. In some examples, the fraction of the intensity of the beam that is outcoupled at each incidence position on the DOE may be about 5%. For example, at incidence position 165, about 5% of the intensity of beam 160 may be outcoupled, with the remainder of beam 160 being caused to propagate towards light guide 110 to form beam 170.

Beam 170, in turn, becomes incident upon the surface of light guide 110 at incidence position 175, from which surface beam 170 is reflected to form beam 180 propagating towards the DOE. Beam 180 becomes incident upon the DOE at an incidence position 182. Since the angle of incidence of beam 180 relative to the DOE remains within the first range of angles, at incidence position 182 a portion (e.g. about 5%) of beam 180 is outcoupled, with the remainder propagating back towards the surface of light guide 110. In this manner, beam 160 and its offspring beams continue to bounce between the DOE and the light guide, with a portion of the beam being outcoupled at each bounce on the DOE, and the remainder of the beams continuing to propagate towards a physical edge of the DOE. So long as the angles of incidence of beam 160 and its offspring beams relative to the DOE remain within the first range of angles, at each incidence or bounce position on the DOE a portion of beam 160 and its offspring beams is outcoupled from light guide 110 by the DOE. As described above, each of these incidence or bounce positions where an outcoupled beam is formed creates an EP.

While the description above uses 5% as an example portion of each incident beam (along the first range of angles) that may be outcoupled by the DOE, it is contemplated that in some examples the percentage or portion of the intensity of each beam (in the first range of angles) that is outcoupled may be different than 5%.

Turning now to beam 150, this beam propagates towards the surface of light guide 110, and becomes incident upon its surface at incidence position 184. At incidence position 184, beam 150 is reflected by the surface of light guide 110 to form beam 186 propagating towards the DOE. Beam 186 then becomes incident upon the DOE at incidence position 188.

As mentioned above, the DOE may interact differently with beams of light based on the angle of incidence of those beams relative to the DOE. Beams whose angles of incidence are within a second range angles that encompasses the incidence angle of beam 135 may have offspring beams split from them by the DOE, which offspring beams then propagate towards the surface of light guide 110 along different directions relative to one another.

As the angle of incidence of beam 186 relative to medium 105 also falls within the second range of angles, the DOE interacts with beam 186 in a manner similar to the DOE's interaction with beam 135. Namely, the DOE splits from beam 186 two offspring beams propagating towards the surface of light guide 110 along different directions relative to each other. The offspring beams of beam 186 then interact with the DOE and light guide 110 in a manner similar to the interaction of offspring beams 145 and 150 of beam 135. In this manner, the offspring beams may cascade across the DOE, and generate a plurality or array of EPs each time a portion of an offspring beam is outcoupled from light guide 110 by the DOE of optical element 100.

As discussed above, FIG. 2 shows the array of EPs generated by the DOE of optical element 100. In this manner, optical element 100 may act as an EPE/OC. In addition, while FIGS. 1 and 2 show nine EPs (i.e. nine incidence positions denoted by concentric filled and unfilled circles), the offspring beams may continue to propagate across the DOE and create additional EPs until the offspring beams reach the physical edges of the DOE.

In general, optical element 100 and its DOE interact differently with beams that are incident upon the DOE at an incidence angle that is in the first range of angles than those beams whose incidence angles are within the second range of angles. For beams, including offspring beams, whose angle of incidence on the DOE is within the first range, a first portion of the beam is outcoupled and a second portion is caused to propagate towards the light guide. For beams, including offspring beams, whose angle of incidence on the DOE is within the second range, the DOE splits from such beams two offspring beams. These offspring beams, in turn, propagate towards the light guide along directions different from one another.

In some examples, the first range of angles may be outside of or non-overlapping with the second range of angles. Moreover, in some examples one or more of the first and second ranges of angles may each be non-continuous ranges of angles. As shown in FIG. 1, the cascading propagation of the offspring beams generate by the DOE allows for the generation of an array of EPs that contributes to increasing the size of the eyebox or field of view of a display that incorporates optical element 100.

In order for the cascading to take place, the DOE directs the offspring beams towards the light guide along directions, and the light guide in turn reflects those offspring beams back towards the DOE along corresponding directions, which directions allow the reflected offspring beams to become incident upon the DOE at angles of incidence that are within the first or the second range of angles. For example, beam 180 is a reflected offspring beam of beam 160. The DOE and light guide 110 cooperate to allow the angle of incidence of beam 180 relative to the DOE to be within the first range of angles, similar to the angle of incidence of beam 160, which is also within the first range.

Similarly, beam 186 is a reflected offspring beam of beam 135. The DOE and light guide 110 cooperate to allow the angle of incidence of beam 186 relative to the DOE to be within the second range of angles, similar to the angle of incidence of beam 135, which is also within the first range. Moreover, beam 160 is another reflected offspring beam of beam 135. The DOE and light guide 110 cooperate to allow the angle of incidence of beam 160 relative to the DOE to be within the first range of angles.

While FIG. 1 shows the DOE splitting from beams in the second range of angles two offspring beams oriented at about 90 degrees to one another, it is contemplated that in some examples the DOE may split from the beams in the second range three or more offspring beams, and that those offspring beams may be oriented to one another at angles other than 90 degrees. Moreover, while the DOE of FIG. 1 operates with two different ranges of angles, it is contemplated that in some examples the DOE of the optical element may treat differently beams that are incident upon it within three or more distinct ranges of angles.

In addition, in FIGS. 1-3 light guide 110 and IC 115 are shown in dashed lines to indicate that in some examples optical element 100 need not comprise one or more of light guide 110 and IC 115. In such examples, one or more of light guide 110 and IC 115 may be separate components or systems, or their functions may be incorporated into a component of optical element 100 or other systems or components that cooperate with optical element 100. In some example optical elements, medium 105 may itself act as the light guide. For example, medium 105 may comprise a light guide, with a DOE recorded or etched at or near a surface thereof. Moreover, in some example optical elements, IC 115 may be recorded or integrated into medium 105 in addition to the DOE.

It is also contemplated that in some examples optical element 100 may comprise light guide 110 and IC 115 along with medium 105, as shown in FIG. 1. In some examples, medium 105 may be disposed on light guide 110, for example a shown in FIGS. 1 and 3. Moreover, in some examples, the medium may be disposed at least partially inside the light guide; an example of such an arrangement is described in greater detail in relation to FIG. 6.

In some examples the DOE may comprise a SRG. Furthermore, in some examples the SRG may be formed at or near a surface of the medium. In some examples, this surface bearing the SRG may be the surface of the medium proximal to or abutting the light guide. In addition, in some examples, the DOE may comprise one or more holograms written or recorded in the medium of the optical element. In some examples, the hologram may comprise a two-dimensional hologram.

Furthermore, in some examples the medium may comprise a holographic recording medium. Moreover, in some examples, the recording medium may comprise a photo-polymerizable composition. In such examples, a beam or pattern of light may be used to polymerize some portions of the medium. These polymerized portions may have a different refractive index than the unexposed portions of the medium. The pattern of variations in the refractive index of the medium may then be described as or function as the hologram. Further, in some examples, the photo-polymerizable composition may comprise a photopolymer.

In this description, depending on the context, "photopolymer" may refer to (a) a mixture of polymer precursors and a photo initiator, which mixture is capable of being at least partially photopolymerized into a resulting polymer, (b) the resulting polymer itself, or (c) a mixture of (a) and (b). In some examples, in the context of a blank holographic recording medium, "photopolymer" may refer to (a) or (c). Moreover, in some examples, in the context of a holographic recording medium with holograms recorded therein, "photopolymer" may refer to (b) or (c). Furthermore, in some examples the polymer precursors may comprise monomers, dimers, oligomers, and the like. In addition, in some examples, the photo initiator may comprise a photo initiator dye, and the like.

Moreover, in some examples, the DOE may comprise a first hologram and a second hologram. If the incidence angle is within the first range of angles relative to the medium, the first hologram may direct a portion of the beam out of the light guide to form the outcoupled beam, and cause the remaining offspring portion of the beam to propagate towards the surface the light guide. If the incidence angle is within the second range of angles relative to the medium, the second hologram may split from the beam the two offspring portions or beams, each propagating towards the surface of the light guide. The two offspring beams may propagate along corresponding directions that are different from one another.

Furthermore, in some examples, the first and second holograms may be recorded in first and second volumes of the medium respectively. In some examples the first and second volumes may be overlapping. This overlap may allow the beam of light that is incident upon the medium at an incidence point to interact with either one of the first and second holograms depending on the angle of incidence of the beam relative to the medium. In other words, the incidence point may be in an overlap region of the medium where the first and second volumes containing the first and second holograms overlap. Moreover, it is contemplated that in some examples the first and second volumes may be coextensive or substantially coextensive.

In some examples, optical element 100 may be used in a full-color display such as those shown in FIGS. 7 and 8, and described in greater detail below. In some examples, the full-color display may use red, green, and blue beams of light to generate full color images. In order to handle the beams of different colors, in some examples, one or more of the first and second holograms may each comprise a wavelength-multiplexed hologram.

In addition, in some examples the beams of light may be incident upon the first and second holograms at different angles based on several parameters including the color of the beams, the spatial position of each pixel within the image being formed by the display, and the like. In order to handle this range of angles, in some examples, one or more of the first and second holograms may each comprise an angle-multiplexed hologram. Furthermore, in some examples, one or more of the first and second holograms may comprise a plurality of constituent holograms. Each constituent hologram may be optimized for interacting with a given range of wavelengths or angles of the light received by the optical element.

In addition, in some examples, the second hologram may spatially separate the different colors within the original beam incident upon the DOE. For example, referring to FIG. 1, if beam 135 where to comprise red, green, and blue colors, at incidence point 140 the second hologram may spatially separate the different colors such that offspring beams 145 and 150 may each comprise separate red, green, and blue beams, with each color beam propagating towards the light guide along a different direction. Once these offspring beams are reflected from the light guide and become incident on the DOE again, each color may then have a spatially separated incidence position on the DOE. This wavelength-based spatial separation may reduce potential wavelength-based crosstalk as the DOE interacts with the offspring beams of different colors.

Figure 4:
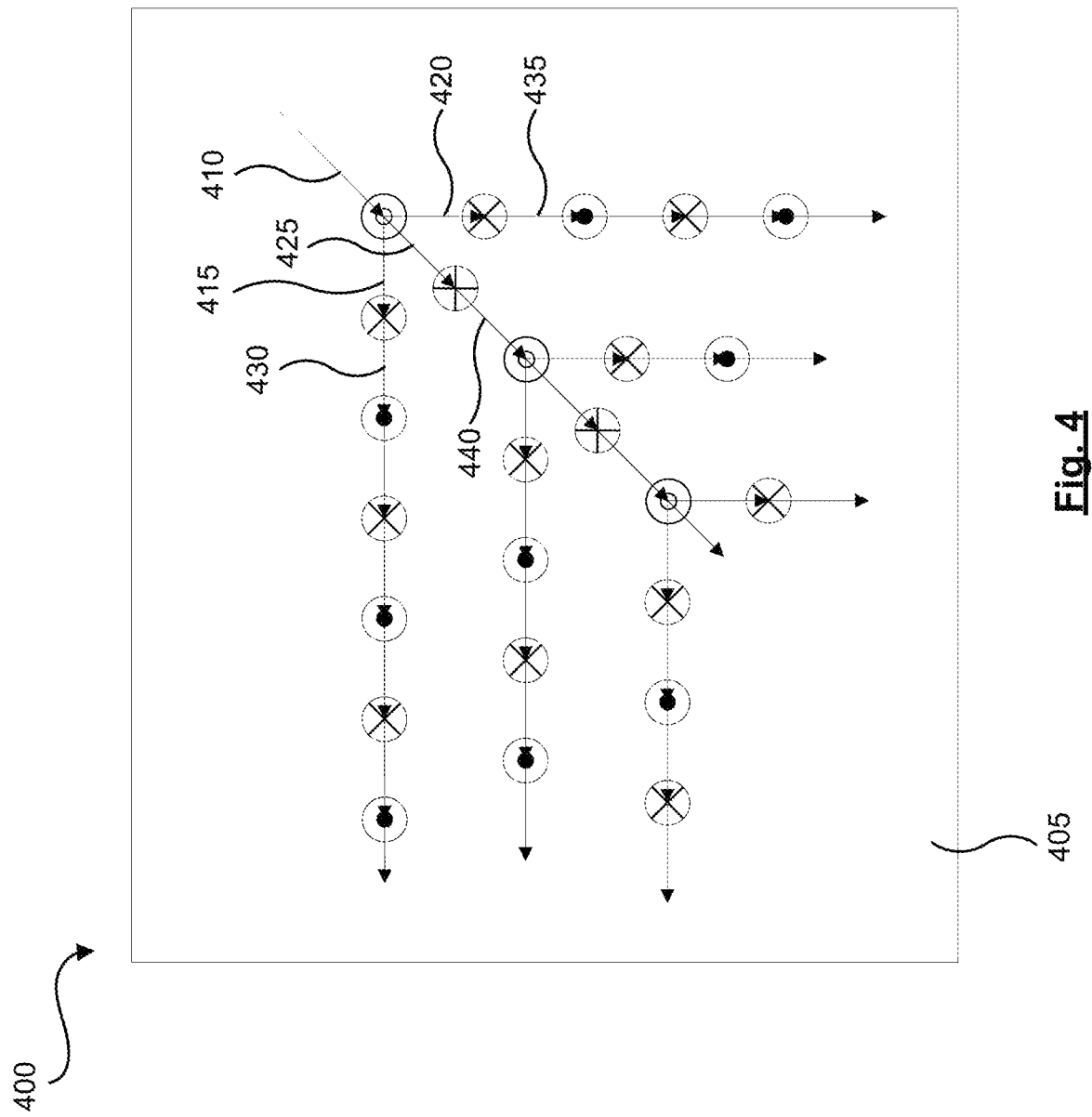
FIG. 4 shows a schematic top plan view of another example optical element, in accordance with a non-limiting implementation of the present specification.

Turning now to FIG. 4, a schematic top plan view is shown of an example optical element 400. Optical element 400 may comprise a medium 405 having a DOE. Medium 405 may have a structure or function similar to medium 105, with a difference being that the first and second ranges of angles and the splitting of beams in the second range of angles are different for medium 405 compared to medium 105.

As shown in FIG. 4, when the DOE of optical element 400 receives a beam 410 that has an incidence angle within the second range, it splits from beam 410 three offspring beams 415, 420, and 425. Beams 415 and 420 are reflected from a light guide (not shown in FIG. 4) and directed back towards medium 405 to form beams 430 and 435 respectively. This light guide may be similar to light guide 110. Beams 430 and 435 are incident upon medium 405 at an incidence angle within the first range of angles. As such, the DOE of medium 405 outcouples a first portion of beams 430 and 435, and causes the remaining portions of beams 430 and 435 to propagate towards the light guide. As the remaining portions of beams 430 and 435, once reflected back towards medium 405 by the light guide, have angles of incidence on medium 405 that remain within the first range of angles, beams 430 and 435 continue to bounce between medium 405 and the light guide towards the physical edges of the DOE of medium 405. At every bounce on the DOE (of breams within the first range of angles), a portion of the beam is outcoupled to form an EP.

Beam 425, in turn, is reflected by the light guide back towards medium 405 to form beam 440. As the angle of incidence of beam 440 remains within the second range of angles, the DOE of medium 405 interacts with beam 440 in a manner similar to the interaction of the DOE with beam 410. Namely, DOE splits from beam 440 three offspring beams. In this manner, the offspring beams of beam 440 continue to cascade across medium 405 towards the physical edges of the DOE of medium 405. It is contemplated that in some examples, the direction of beam 440 may be about parallel to the direction of beam 410.

As discussed above, in some examples, the first range of angles may be a non-continuous range of angles. In the example shown in FIG. 4, the first range of angles may include angles at or close to the angle of beam 435, as well as angles at or close to the angle of beam 430. It is contemplated that the first range of angles need not include all angles between the angle of beam 435 and the angle of beam 430. For example, the first range of angles does not include angles at or close to the angle of beam 440.

In this description, the use of phrases "first range of angles", "second range of angles", and "DOE" are specific to each medium in relation to which these phrases are used. In other words, "first range of angles", "second range of angles", and "DOE" used in relation to one medium may be different than the "first range of angles", "second range of angles", and "DOE" used in relation to a different medium.

Figure 5:
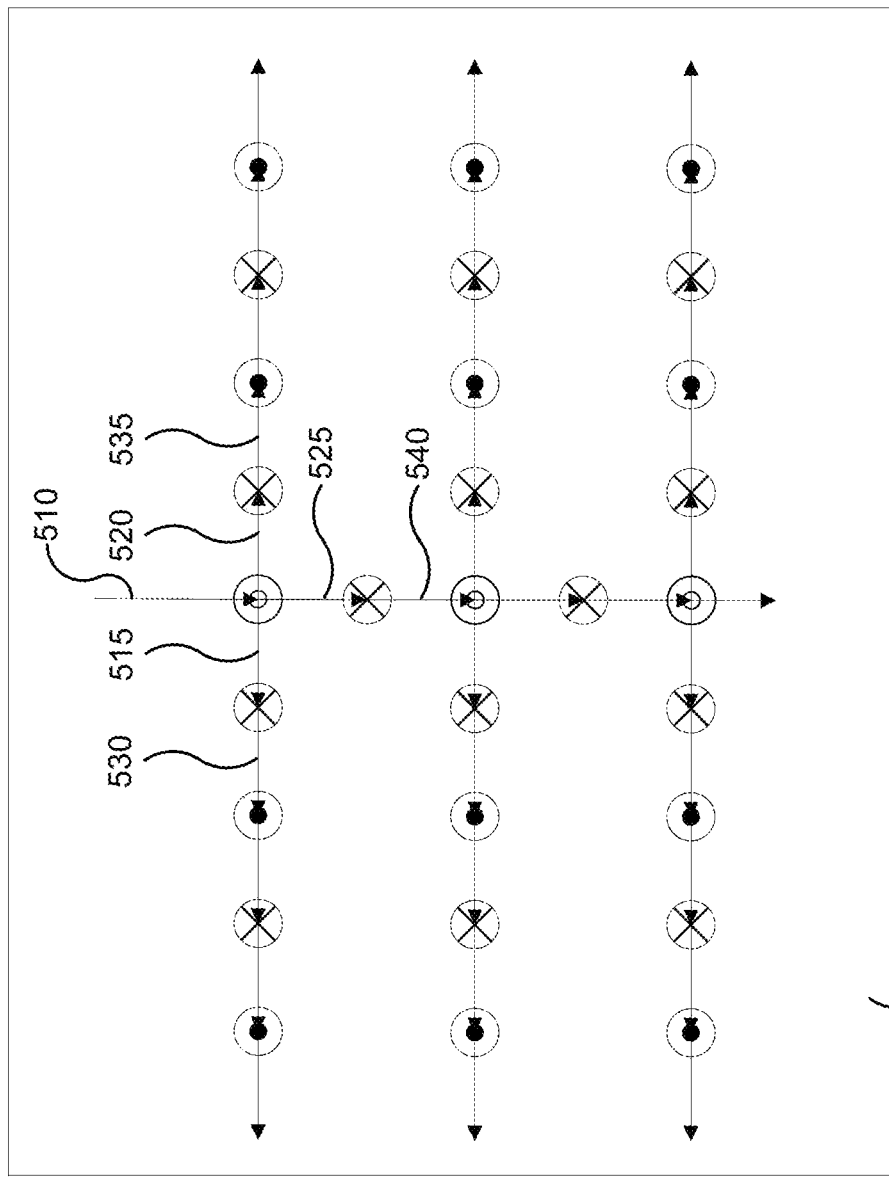
FIG. 5 a schematic top plan view of yet another example optical element, in accordance with a non-limiting implementation of the present specification.

Turning now to FIG. 5, a schematic top plan view is shown of an example optical element 500. Optical element 500 may comprise a medium 505 having a DOE. Medium 505 may have a structure or function similar to medium 105, with a difference being that the first and second ranges of angles and the splitting of beams in the second range of angles are different for medium 505 compared to medium 105.

As shown in FIG. 5, when the DOE of optical element 500 receives a beam 510 that has an incidence angle within the second range of angles, the DOE splits from beam 510 three offspring beams 515, 520, and 525. Beams 515 and 520 are reflected from a light guide (not shown in FIG. 5) and directed back towards medium 505 to form beams 530 and 535 respectively. This light guide may be similar to light guide 110. Beams 530 and 535 are incident upon medium 505 at an incidence angle within the first range of angles. As such, the DOE of medium 505 outcouples a first portion of beams 530 and 535, and causes the remaining portions of beams 530 and 535 to propagate towards the light guide. As the remaining portions of beams 530 and 535, once reflected back towards medium 505 by the light guide, have angles of incidence on medium 505 that remain within the first range of angles, beams 530 and 535 continue to bounce between medium 505 and the light guide towards the physical edges of the DOE of the medium 505. At every bounce on the DOE, a portion of the beam is outcoupled to form an EP.

Beam 525, in turn, is reflected by the light guide back towards medium 505 to form beam 540. As the angle of incidence of beam 540 remains within the second range of angles, the DOE of medium 505 interacts with beam 540 in a manner similar to the interaction of the DOE with beam 510. Namely, DOE splits from beam 540 three offspring beams. In this manner, the offspring beams of beam 540 continue to cascade across medium 505 towards the physical edges of the DOE of medium 505. It is contemplated that in some examples, the direction of beam 540 may be about parallel to the direction of beam 510.

Figure 6:
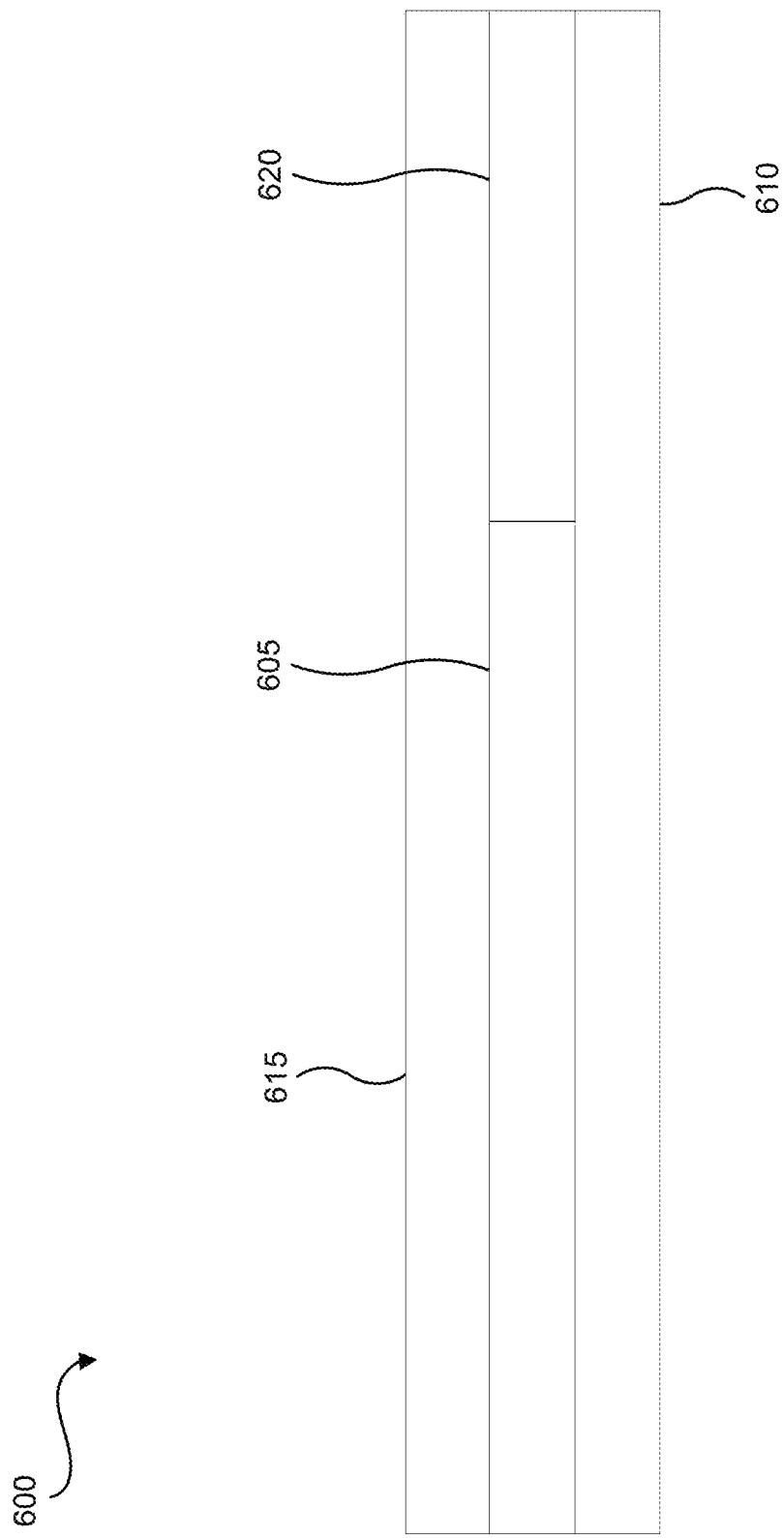
FIG. 6 shows a schematic side elevation view of yet another example optical element, in accordance with a non-limiting implementation of the present specification

While FIG. 5 shows both beams 515 and 520 propagating towards a common surface of the light guide, it is contemplated that in some examples beams 515 and 520 may propagate in about opposite directions. In such examples, portions of the light guide may be disposed on two opposite sides of the medium such that one of beams 515 and 520 becomes incident on a first surface of the light guide and the other of beams 515 and 520 becomes incident on a second surface of the light guide. FIG. 6 shows a schematic side elevation view of an example optical element 600. In optical element 600 a medium 605 may be sandwiched between a first portion 610 and a second portion 615 of a light guide, with portions 610 and 615 being disposed on opposite sides of medium 605.

Medium 605 may have a structure or function similar to those of medium 505, or another one of the media of optical elements described herein. In addition, optical element 600 may comprise an IC 620, also disposed between portions 610 and 615 of the light guide. Optical element 600 may provide an example arrangement in which the medium is disposed at least partially inside the light guide.

Figure 7:
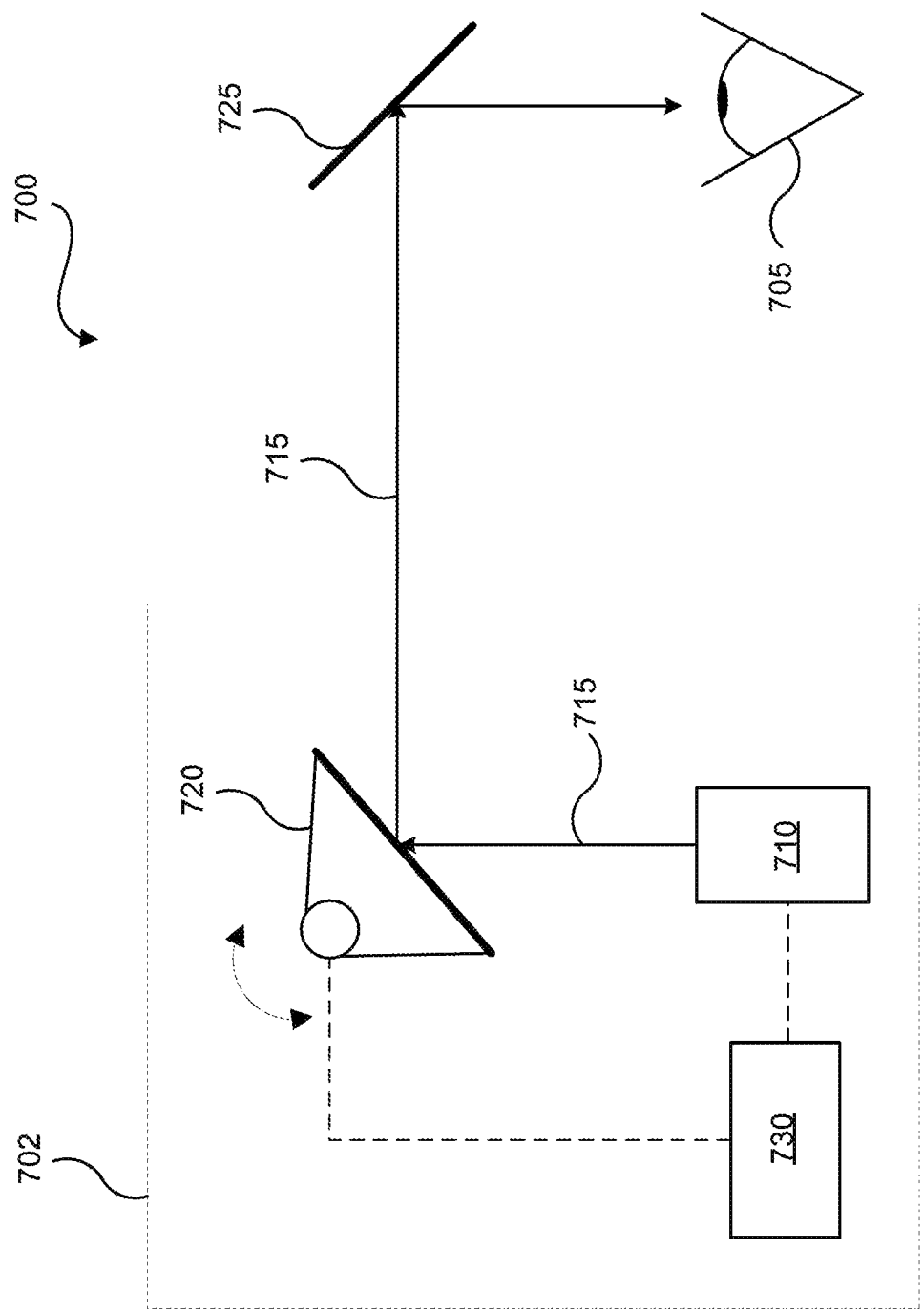
FIG. 7 shows a schematic representation of an example system which may be used to form or project an image, in accordance with a non-limiting implementation of the present specification.

Turning now to FIG. 7, a schematic representation of an example system 700 is shown. System 700 may be used to form or project an image viewable by an eye 705 of a viewer. System 700 may also be referred to or described as an image projection device, a display device, a display system, or a display. The viewer may also be described as a user of system 700. System 700 may comprise a light engine 702 to generate a beam of output light 715. In some examples, light engine 702 may comprise a light source 710 to generate output light 715. Light source 710 may comprise at least one laser, at least one light emitting diode, and the like. Light engine 702 may also comprise a spatial modulator 720 to receive output light 715 from light source 710. In some examples, spatial modulator 720 may comprise a movable reflector, a micro-electro-mechanical system (MEMS), a digital micromirror device (DMD), and the like. In some examples, spatial modulator 720 may be part of a relay optic of system 700.

While FIG. 7 shows light engine 702 as comprising spatial modulator 720, it is contemplated that in some examples light engine 702 need not comprise spatial modulator 720 or light source 710. In some examples, light engine 702 may comprise a micro-display, or other light sources suitable for forming an image.

Furthermore, system 700 may comprise a display optic 725 to receive output light 715 from light engine 702 and direct the output light towards eye 705 of a user of the WHUD to form an image viewable by the user. In some examples, display optic 725 may comprise a light guide. In some examples the light guide may be similar to light guide 110, the other light guides described herein, and the like. Display optic 725 may also comprise an incoupler optically coupled to the light guide. The incoupler may receive the beam from light engine 702 and direct at least a portion of the beam to propagate along a corresponding direction into the light guide. In some examples, the incoupler may be similar in function or structure to IC 115, IC 620, the other ICs described herein, and the like.

Display optic 725 may also comprise an optical element. The optical element may be optically coupled to the light guide. In some examples, the optical element may comprise optical element 100, 400, 500, 600, another of the optical elements described herein, or the like.

Moreover, in some examples system 700 may be a part of or incorporated into a wearable heads-up display (WHUD). Such a heads-up display may have different designs or form factors, such as the form factor of eyeglasses, as is described in greater detail in relation to FIG. 8. In examples where system 700 is in the form factor of glasses, display optic 725 may be on or in a lens of the glasses.

In addition, in some examples light engine 702 may comprise a controller 730 in communication with light source 710 and spatial modulator 720. Controller 730 may control light source 710 and spatial modulator 720 to project an image. In some examples, the image to be projected may be a still image, a moving image or video, an interactive image, a graphical user interface, and the like.

In some examples, the controllers described herein such as controller 730 may comprise a processor in communication with a non-transitory processor-readable medium. The processor-readable medium may comprise instructions to cause the processors to control the light source and the spatial modulator to form images viewable by the user of system 700. Moreover, in some examples the controllers may be free-standing components, while in other examples the controllers may comprise functional modules incorporated into other components of their respective systems.

Furthermore, in some examples the controllers or their functionality may be implemented in other ways, including: via Application Specific Integrated Circuits (ASICs), in standard integrated circuits, as one or more computer programs executed by one or more computers (e.g., as one or more programs running on one or more computer systems), as one or more programs executed by on one or more controllers (e.g., microcontrollers), as one or more programs executed by one or more processors (e.g., microprocessors, central processing units, graphical processing units), as firmware, and the like, or as a combination thereof.

Figure 8:
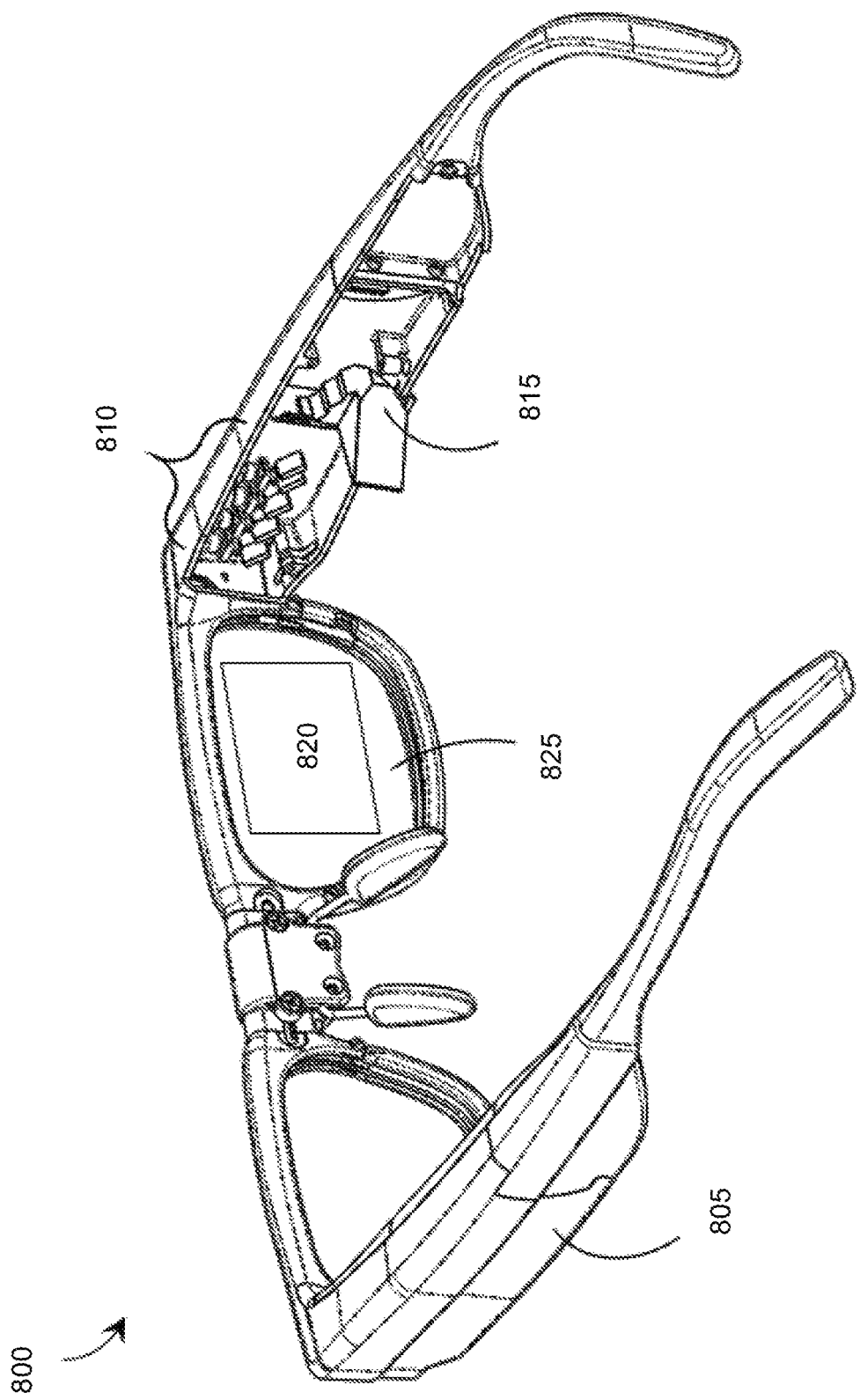
FIG. 8 shows a partial-cutaway perspective view of an example wearable heads-up display, in accordance with a non-limiting implementation of the present specification.

Turning now to FIG. 8, a partial-cutaway perspective view of an example wearable heads-up display (WHUD) 800 is shown. WHUD 800 includes a support structure 805 that in use is worn on the head of a user and has the general form factor and appearance of an eyeglasses (e.g. sunglasses) frame. Eyeglasses or sunglasses may also be generically referred to as "glasses". Support structure 805 may carry components of a system to display an image, such as system 700. For example, the light source module may be received in a space 810 in a side arm of support structure 805.

The spatial modulator of the systems described herein may be received in or be part of component 815 of support structure 805. The spatial modulator in turn may direct the output light onto a display optic 820 carried by a lens 825 of support structure 805. In some examples, display optic 820 may be similar in structure or function to display optic 725. Moreover, in some examples display optic 820 may comprise an optical element such as optical element 100, 400, 500, 600, or another of the optical elements described herein.

Figure 9:
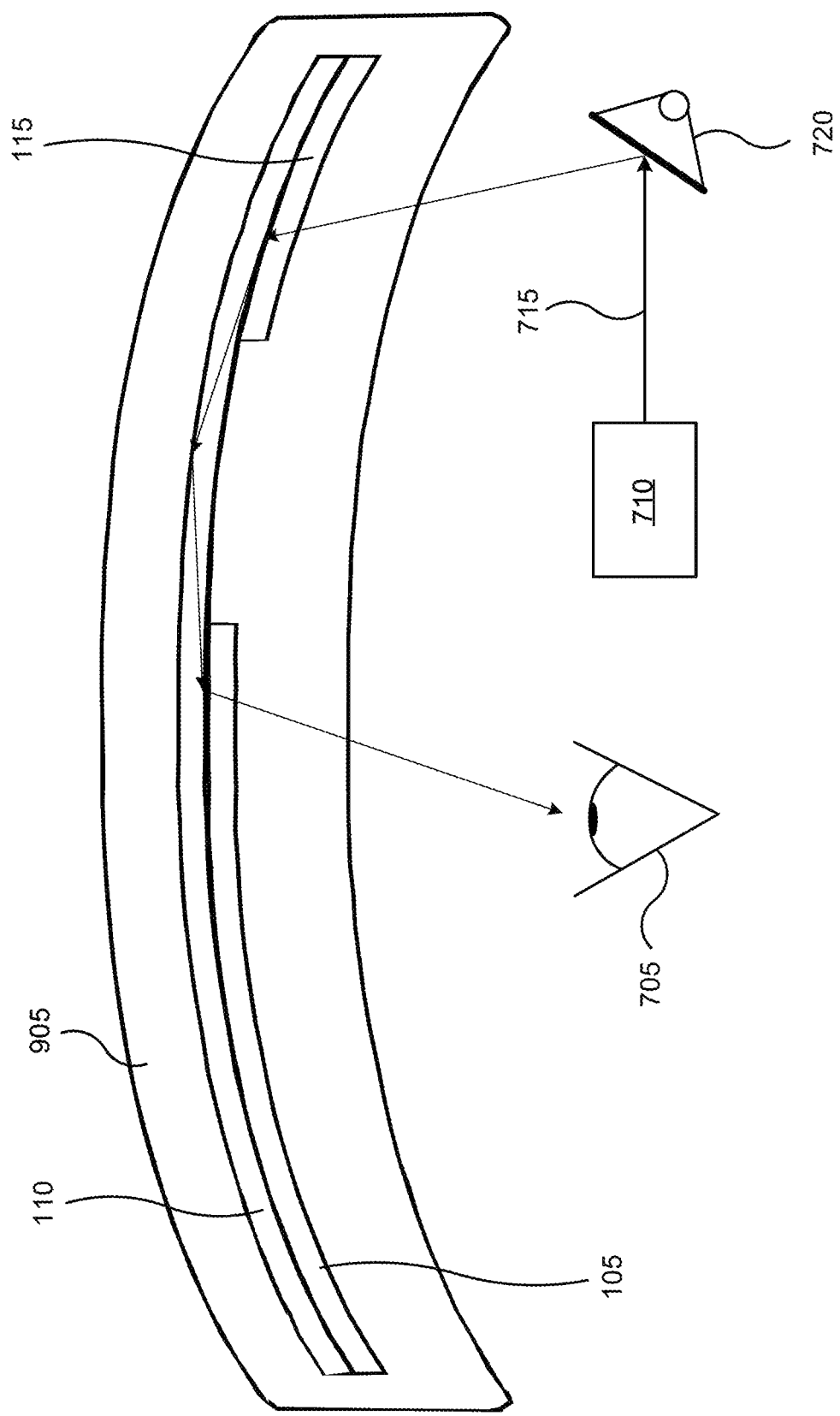
FIG. 9 shows a schematic cross-sectional representation of an example lens of an example wearable heads-up display, in accordance with a non-limiting implementation of the present specification.

Turning now to FIG. 9, a schematic cross-sectional representation is shown of an example lens 905 of an example WHUD. The components in FIG. 9 are not cross-hatched to allow for a clearer illustration of the path of an example ray of light traversing these components. In some examples, lens 905 may be used as lens 825 in WHUD 800. Lens 905 has embedded within it a display optic comprising optical element 100. It is contemplated that in some examples, the display optic may comprise another optical element such as optical element 400, 500, 600, or another of the optical elements described herein.

The display optic comprises light guide 110, and medium 105 and IC 115 affixed to light guide 110. IC 115 may direct at least a portion of output light 715 into light guide 110 to form an incoupled beam. Medium 105, in turn, may act as an OC to outcouple from light guide 110 a portion of the incoupled beam to form an outcoupled beam propagating towards eye 705 of a viewer. While not shown in FIG. 9, it is contemplated that medium 105 may also act an EPE and generate a plurality of EPs that may enter eye 705 and become viewable by the user of the WHUD incorporating lens 905.

Moreover, it is contemplated that in some examples, this display optic may be used as display optic 725 in system 700. In some examples, light guide 110 may guide light within it using total internal reflection. IC 115 may receive an incoming beam of light, such as output light 715 generated by light source 710. IC 115 may then redirect output light 715 towards light guide 110 at an angle that allows output light 715 to enter light guide 110, and to travel through light guide 110. Total internal reflection may prevent output light 715 from leaking from the walls of light guide 110.

Once output light 715 that is travelling in light guide 110 reaches and becomes incident upon the DOE of medium 105, the DOE may direct a portion of output light 715 out of light guide 110 and towards eye 705 of a user. In some examples, the combination of light guide 110, medium 105, and IC 115 may be described as a display optic. Such a display optic may be used as, or as a part of, display optic 725 in system 700 or display optic 820 in WHUD 800.

Throughout this specification and the appended claims, infinitive verb forms are often used. Examples include, without limitation: "to receive," "to direct," "to form," and the like. Unless the specific context requires otherwise, such infinitive verb forms are used in an open, inclusive sense, that is as "to, at least, receive," to, at least, direct," "to, at least, form," and so on.

The above description of illustrated example implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. Moreover, the various example implementations described herein may be combined to provide further implementations. To the extent that they are not inconsistent with the specific teachings and definitions herein, U.S. Provisional Patent Application No. 62/791,514, U.S. Provisional Patent Application No. 62/943,381, and U.S. Provisional Patent Application No. 62/946,705 are incorporated by reference herein in their entirety.

In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. An optical element comprising:
a diffractive optical element (DOE);
a medium comprising the DOE and configured to receive a beam of light propagating along a first direction via a light guide, wherein the DOE is configured to:
split the beam of light into a plurality of beam portions, each beam portion configured to reflect off a surface of the light guide;
receive each beam portion as reflected off the surface of the light guide, wherein each received beam portion as reflected off a surface of the light guide is incident upon the medium at a respective incidence angle;
in response to a beam portion being incident upon the medium at a respective incidence angle within a first range of angles relative to the medium:
direct a first portion of the beam portion out of the light guide along a second direction to form a respective exit pupil; and
cause a second portion of the beam portion to propagate towards the surface of the light guide; and
in response to a beam portion being incident upon the medium at a respective incidence angle within a second range of angles relative to the medium:
split from the beam portion a third portion and a fourth portion each propagating towards the surface of the light guide, the third portion and the fourth portion propagating along a third direction and a fourth direction respectively, the third direction different than the fourth direction.

2. The optical element of claim 1, wherein the third direction is about orthogonal to the fourth direction.

3. The optical element of claim 1, wherein the third direction is opposite to the fourth direction.

4. The optical element of claim 1, wherein the first range of angles is outside the second range of angles.

5. The optical element of claim 1, wherein the DOE comprises one of a surface relief grating, a hologram, a two-dimensional hologram, or a plurality of holograms.

6. The optical element of claim 1, wherein the DOE comprises:
a first hologram to:
in response to a beam portion being incident upon the medium at a respective incidence angle within the first range of angles relative to the medium:
direct the first portion of the beam portion out of the light guide to form the respective exit pupil; and
cause the second portion of the beam portion to propagate towards the surface the light guide; and
a second hologram to:
in response to a beam portion being incident upon the medium at a respective incidence angle within the second range of angles relative to the medium:
split from the beam portion the third portion and the fourth each propagating towards the surface of the light guide, the third portion and the fourth portion propagating along the third direction and the fourth direction respectively, the third direction different than the fourth direction.

7. The optical element of claim 6, wherein:
the first hologram is recorded in a first volume within the medium; and
the second hologram is recorded in a second volume within the medium, the second volume overlapping the first volume.

8. The optical element of claim 1 wherein:
the DOE is configured to, in response to a beam portion being incident upon the medium at a respective incidence angle within the first range of angles, cause the second portion of the beam portion to propagate towards the surface of the light guide along a fifth direction; and
the surface of the light guide is configured to:
reflect a respective second portion of a beam portion towards the medium along a sixth direction, the sixth direction being within the first range of angles relative to the medium;
reflect a respective third portion of a beam portion towards the medium along a seventh direction, the seventh direction being within the first range of angles relative to the medium; and
reflect a respective fourth portion of a beam portion towards the medium along an eighth direction, the eighth direction being within the second range of angles relative to the medium.

9. The optical element of claim 1 wherein:
the DOE is further configured to, in response to a beam portion being incident upon the medium at a respective incidence angle within the second range of angles, split from the beam portion a fifth portion propagating towards the surface of the light guide along a ninth direction; and
the surface of the light guide is to reflect the fifth portion towards the medium along a tenth direction being about parallel to the first direction.

10. A wearable heads-up display (WHUD) comprising:
a light engine to generate a beam of light; and a display optic to receive the beam of light from the light engine and direct the beam of light towards an eye of a user of the WHUD to form an image viewable by the user, the display optic comprising:
a light guide;
an incoupler optically coupled to the light guide, the incoupler to receive the beam of light from the light engine and direct at least a portion of the beam of light to propagate along a first direction into the light guide; and
an optical element comprising:
a medium comprising a diffractive optical element (DOE), the medium to receive the beam of light propagating along the first direction via the light guide at a first incidence point on the medium, wherein the DOE is configured to:
split the beam of light into a plurality of beam portions, each beam portion configured to reflect off a surface of the light guide;
receive each beam portion as reflected off the surface of the light guide, wherein each received beam portion as reflected off the surface of the light guide is incident upon the medium at a respective incidence angle;
in response to a beam portion being incident upon the medium at a respective incidence angle within a first range of angles relative to the medium:
direct a first portion of the beam prion out of the light guide along a second direction to form a respective exit pupil; and
cause a second portion of the beam portion to propagate towards a surface of the light guide; and
in response to a beam portion being incident upon the medium at a respective incidence angle within a second range of angles relative to the medium:
split from the beam portion a third portion and a fourth portion of the beam portion each propagating towards the surface of the light guide, the third portion and the fourth portion propagating along a third direction and a fourth direction respectively, the third direction different than the fourth direction.

11. The WHUD of claim 10, wherein the third direction is about orthogonal to the fourth direction.

12. The WHUD of claim 10, wherein the third direction is opposite to the fourth direction.

13. The WHUD of claim 10, wherein the first range of angles is outside the second range of angles.

14. The WHUD of claim 10, wherein the DOE comprises one of a surface relief grating, a hologram, a two-dimensional hologram, or a plurality of holograms.

15. The WHUD of claim 10, wherein the DOE comprises:
a first hologram to:
in response to a beam portion being incident upon the medium at a respective incidence angle within the first range of angles relative to the medium:
direct the first portion of the beam portion out of the light guide to form the respective exit pupil; and
cause the second portion of the beam portion to propagate towards the surface the light guide; and
a second hologram to:
in response to a beam portion being incident upon the medium at a respective incidence angle is-within the second range of angles relative to the medium:
split from the beam portion the third portion and the fourth portion each propagating towards the surface of the light guide, the third portion and the fourth portion propagating along the third direction and the fourth direction respectively, the third direction different than the fourth direction.

16. The WHUD of claim 15, wherein:
the first hologram is recorded in a first volume within the medium; and
the second hologram is recorded in a second volume within the, the second volume overlapping the first volume.

17. The WHUD of claim 10, wherein the medium is disposed on the light guide.

18. The WHUD of claim 10, wherein the medium is disposed at least partially inside the light guide.

19. The WHUD of claim 10, wherein:
the DOE is configured to, in response to a beam portion being incident upon the medium at a respective incidence angle within the first range of angles, cause the second portion of the beam portion to propagate towards the surface of the light guide along a fifth direction; and
the surface of the light guide is configured to:
reflect a respective second portion of a beam portion towards the medium along a sixth direction, the sixth direction being within the first range of angles relative to the medium;
reflect a respective third portion of a beam portion towards the medium along a seventh direction, the seventh direction being within the first range of angles relative to the medium; and
reflect a respective fourth portion towards the medium along an eighth direction, the eighth direction being within the second range of angles relative to the medium.

20. The WHUD of claim 10, wherein:
the DOE is further configured to, in response to a beam portion being incident upon the medium at a respective incidence angle within the second range of angles, split from the beam portion a fifth portion propagating towards the surface of the light guide along a ninth direction; and
the surface of the light guide is configured to reflect the fifth portion towards the medium along a tenth direction being about parallel to the first direction.

* * * * *

UNITED STATES PATENT AND TRADEMARK OFFICE
CERTIFICATE OF CORRECTION

PATENT NO. : 11,630,318 B2
APPLICATION NO. : 16/737322
DATED : April 18, 2023
INVENTOR(S) : Shreyas Potnis et al.

It is certified that error appears in the above-identified patent and that said Letters Patent is hereby corrected as shown below:

In the Claims

At Column 16 Line 19, please correct "surface the" to be --surface of the--

At Column 16 Line 36, please correct "claim 1" to be --claim 1,--

At Column 16 Line 56, please correct "claim 1" to be --claim 1,--

At Column 17 Line 30, please correct "beam prion" to be --beam portion--

At Column 18 Line 10, please correct "angle is-within" to be --angle within--

At Column 18 Line 21, please correct "within the," to be --within the medium,--

Signed and Sealed this
Twenty-eighth Day of November, 2023

Katherine Kelly Vidal
*Director of the United States Patent and Trademark Office*